No. 821,888. PATENTED MAY 29, 1906.
J. F. ROSS.
CAN.
APPLICATION FILED JUNE 24, 1905.

Witnesses.
H. H. Rosser.
L. G. Sharpe.

Inventor:
J. F. Ross,
by Egerton R. Cox
Att.

UNITED STATES PATENT OFFICE.

JOHN FORSTER ROSS, OF TORONTO, CANADA, ASSIGNOR OF TWO-FIFTHS TO PERCY FORSTER ROSS, TWO-FIFTHS TO WILLIAM EDWIN ROSS, AND ONE-FIFTH TO CHARLES FRED VANHORN, ALL OF TORONTO, CANADA.

CAN.

No. 821,288. Specification of Letters Patent. Patented May 29, 1906.

Application filed June 24, 1905. Serial No. 266,882.

*To all whom it may concern:*

Be it known that I, JOHN FORSTER ROSS, manufacturer, a subject of the King of Great Britain, residing in the city of Toronto, in the county of York, in the Province of Ontario, Canada, have invented certain new and useful Improvements in Cans, of which the following is a specification.

My invention relates to improvements in cans; and the objects of my invention are, first, to construct a cheap and simple can that may be hermetically sealed; secondly, to strengthen the seam or joint so as to prevent cracking of same; thirdly, to expel as much air as possible from the can before same is hermetically sealed, and, fourthly, to provide a particular lid; and it consists, essentially, of a can-body made of sheet metal and provided with a bell-shaped mouth, the upper portion of said can for the required distance being uniformly stretched, so that the diameter of the can at its stretched portion will be greater than the diameter of the can at its unstretched portion, the joint or seam filled with soldering material, and a bottom made of sheet metal suitably secured to said can-body. In the said can-body I preferably stamp out therefrom and over the seam or joint a lug, so as to afford a brace which will prevent cracking or splitting of the solder in said joint or seam during manufacture of the can-body.

My invention also consists in the particular construction of the lid hereinafter described.

Figure 1:
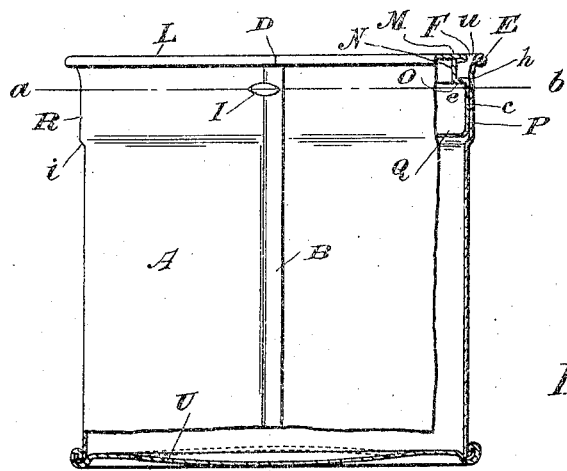
Figure 2:
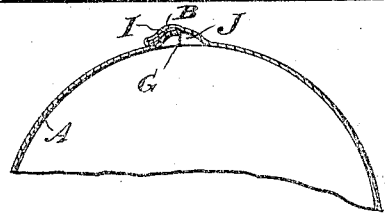
Figure 3:
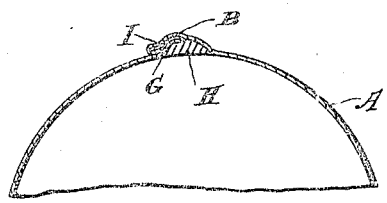
Figure 4:
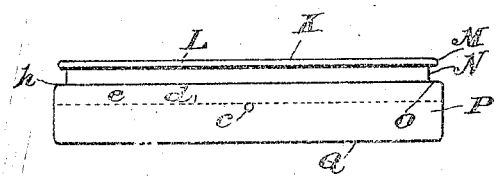

Figure 1 is a side elevation of a can constructed according to my invention, a portion thereof being shown in vertical section. Fig. 2 is a portion of a horizontal cross-section on the line *a b*, Fig. 1, the lid being removed and the joint or seam being free of soldering material. Fig. 3 is a view similar to Fig. 2, only showing the joint or seam filled with soldering material. Fig. 4 is a side elevation of my preferred form of lid or cover, and Fig. 5 is a reduced view of the blank of sheet metal out of which the can-body is preferably formed.

In the drawings like characters of reference indicate corresponding parts in each figure.

A is the can-body, made of sheet metal and having its ends secured together in any of the well-known manners. As shown in the drawings, the ends are secured together by the usual outside lock-seam B.

Figure 5:
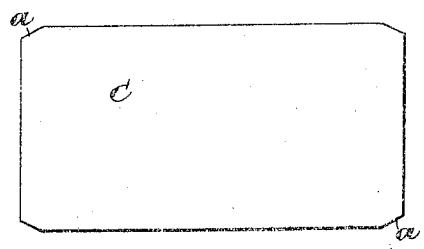

Referring to Fig. 5, it will be seen that the corners *a* of the sheet of metal C, out of which the can-body is preferably formed are cut away, so that there will only be one thickness of metal at the point D of the seam, so that the beading E may be there properly formed. Of course this construction just described will also be embodied in the bottom of the can. The can-body is provided with a bell-shaped mouth F, which may or may not be provided with the beading E. In order to make the joint or seam G flush with the inner surface of the can, I fill same with suitable soldering material H and remove the surplus soldering material, so that the said joint or seam will be flush with the inner surface of said can-body. During the removal of the surplus soldering material I stretch the upper portion of the can-body for a suitable distance from the bell-shaped mouth downward, so as to insure a true sealing-surface when the lid is inserted therewithin. The can-body A is provided with the bell-shaped mouth F before it is stretched, as described, and it will be understood that during the stretching operation the adjacent ends of the sheet metal at the point D will not be subjected to this strain by reason of said bell-shaped mouth, thus preventing any cracking or splitting in the joint creeping from said point D downward. From this it will be understood that the diameter of the can-body at its bell-shaped mouth is greater than the diameter of the rest of the can-body. Consequently the stretching strain on the walls of said can-body will not affect said joint or seam in such a manner as to cause separation of the abutting portions of metal at the point D. Of course the abutting portions of metal at the point D may be more or less provided with soldering material; but even so, where the can-body constructed without the bell-shaped mouth F, the joint or seam at the point D would be directly in the plane of the stretching force, thus causing them to separate and split the joint or seam. In order to prevent any possible chance of the soldering material H filling the joint or seam G from being cracked or split during the manufacture of the can-body, I stamp out from said can-body in that portion of the can where the greatest bursting strain is applied a lug I, which acts as a brace. This lug I forms a cavity J in the joint or seam and same of course is filled with the soldering material, thus enabling me to increase the volume of soldering material at the point of application of the greatest bursting strain, thus additionally preventing the cracking of the joint or seam. This lug I of course may be of any suitable shape and size. The stamping out of this lug I hardens the tin, thus insuring said lug performing its function of a brace.

The lid or cover K, I use with my can consists of the top L, provided on its edge with a flange M, which overhangs a vertical flange N, which is provided with a horizontal outwardly-projecting flange O, which in turn is provided with a vertical flange P, which may be of any suitable depth. If desired, the lower edge Q of the flange P may be slightly turned inward, as shown. The worked parts or portions of the sheet metal in the lid or cover K are much harder than the sheet metal out of which the can-body is formed. During the removal of the surplus soldering material in the can-body and consequent stretching of the upper portion thereof, the stretched material of said can-body is thus made harder than the unstretched material, because of the working of the metal. The external diameter of the lid or cover K, measured through the flange P, is slightly greater than the internal diameter of the stretched portion of the can-body A. From this it will be understood that when the lid K is forced into the can the stretched portion R of said can-body A will be further stretched, and thus assume approximately the shape shown in Fig. 1. As the flange P of the lid or cover K is particularly hard, there is no possible danger of same being crushed inward.

It will be understood that the surplus soldering material H filling the joint or seam G need be removed only for the distance the flange P is in contact with the can-body A. The flange P is provided with a small hole c just below the lower edge d (shown by dotted lines) of the sealing-surface e of said flange, which extends approximately in depth from the shoulder h down to the dotted line d on the outer circumference of said flange.

It will be understood that there is always more or less air imprisoned within the can-body A during the insertion of the lid or cover K thereinto, and in order to remove as much as possible of this air before the can is hermetically sealed I provide the said hole c.

The air within the can-body will of course be held between the top of the contents in said can-body and the lid K, and during forcing of said lid home a great portion of the imprisoned air will be forced out of the hole c and between the flange P and the can-body.

I of course may provide my can-body A with any suitable bottom; but in order to reduce the pressure of the air within said can-body it is impossible for me to remove I construct said can-body with a flexible bottom U, the normal position of which is shown in dotted lines. When the lid or cover K is forced home, the said flexible bottom U will bulge out in the position shown, thus providing additional room within said can-body, and thus reduce to a minimum the back pressure against the lid of the imprisoned air.

Taking the dotted line d as being the depth of the sealing area, I extend the flange P below said sealing area, so that the portion of said flange therebelow will provide a means for giving said lid or cover proper support within the can-body, so that it will be easier inserted and better supported and not liable to be pushed sidewise and jammed.

Upon referring to Fig. 1, it will be seen that the diameter of the top L of the lid or cover is sufficiently less than the diameter of the top of the can-body, so as to form an annular groove u, in which is inserted the means for removing the lid or cover.

It will of course be understood that the expansion of the can-body A (shown in the drawings) is much exaggerated.

Upon referring to Fig. 1 it will be seen that I preferably stamp out the lug I so that it will be midway the depth of the sealing area e.

When the lid or cover K is shoved home, top of same is on a level with the upper edge of the can-body A. During the construction of the can-body an outwardly-formed annular shoulder i is formed therein, and same will of course be below the lower edge Q of the flange P. Of course the flange Q may abut against the shoulder i; but this is immaterial.

Of course during manufacture of the bell-shaped mouth F the portion of the can-body that forms the bell-shaped mouth is stretched; but the subsequent stretching of the can-body occurs from the bottom of said bell-shaped mouth downward.

Obviously the longitudinal diameter of the lug or brace I is placed approximately at right angles to the joint or seam G.

I do not confine myself to the construction herein shown and described, as same may be altered in various ways without departing from the spirit of my invention.

What I claim as my invention is—

1. A can-body comprising a blank of sheet metal bent into cylindrical form, and provided with a bell-shaped mouth; said can-body being stretched at its upper portion for a suitable distance downward from said bell-shaped mouth so that its diameter at its stretched portion is greater than its diameter below said stretched portion; a lug or brace stamped out from said body in its stretched portion at the joint or seam formed in said can-body by the securing of the ends of said blank together, thus forming a brace to prevent the opening of said joint or seam, and soldering material filling the joint or seam and said lug or brace so that the surface of the can at said joint or seam and lug or brace will be flush with the rest of the surface of the can.

2. A can comprising a blank of sheet metal bent into cylindrical form and provided with a bell-shaped mouth, and being stretched at its upper portion for a suitable distance downward from said bell-shaped mouth so that its diameter at its stretched portion is greater than its diameter below said stretched portion, and soldering material filling the joint on the inside of said can so that the surface of the can at said joint or seam will be flush with the rest of the surface of the can, a circular lid or cover made out of sheet metal, comprising the top integrally provided on its edge with an annular flange which overhangs an integrally-formed first downwardly-extending vertical flange the lower edge of which integrally forms part of a horizontal outwardly-extending flange the outer edge of which integrally forms part of a second downwardly-extending vertical flange, the diameter of said lid or cover being greater at said second-mentioned vertical flange than at said first-mentioned vertical flange, the relation of the outside diameter of the top of said lid or cover to the diameter of said can at its top being such that there is an annular space left between the edge flange of said lid and the top of said can.

3. A can comprising a blank of sheet metal bent into cylindrical form, and provided with a bell-shaped mouth, and being stretched at its upper portion for a suitable distance downward from said bell-shaped mouth so that its diameter at its stretched portion is greater than its diameter below said stretched portion; a lug or brace stamped out from said body in its stretched portion at the joint or seam formed in said can by the securing of the ends of said blank together, thus forming a brace to prevent the opening of said joint or seam; soldering material filling the joint or seam and said lug or brace so that the surface of the can at said joint or seam and lug or brace will be flush with the rest of the surface of the can, and a flexible bottom for said can, a circular lid or cover made out of sheet metal, comprising the top integrally provided on its edge with an annular flange which overhangs an integrally-formed first downwardly-extending vertical flange the lower edge of which integrally forms part of a horizontal outwardly-extending flange the outer edge of which integrally forms part of a second downwardly-extending vertical flange which is provided with a small hole, the diameter of said lid or cover being greater at said second-mentioned vertical flange than at said first-mentioned vertical flange, the relation of the outside diameter of the top of said lid or cover to the diameter of said can at its top being such that there is an annular space left between the edge flange of said lid and the top of said can.

4. A can comprising a blank of sheet metal bent into cylindrical form, and provided with a bell-shaped mouth, and being stretched at its upper portion for a suitable distance downward from said bell-shaped mouth so that its diameter at its stretched portion is greater than its diameter below said stretched portion; a lug or brace stamped out from said body in its stretched portion where the greatest bursting strain is applied at the joint or seam formed in said can by the securing of the ends of said blank together, thus forming a brace to prevent the opening of said joint or seam; soldering material filling the joint or seam and said lug or brace so that the surface of the can at said joint or seam and lug or brace will be flush with the rest of the surface of the can, and a flexible bottom for said can; a circular lid or cover made out of sheet metal, comprising the top integrally provided on its edge with an annular flange which overhangs an integrally-formed first downwardly-extending vertical flange the lower edge of which integrally forms part of a horizontal outwardly-extending flange the outer edge of which integrally forms part of a second downwardly-extending vertical flange which is provided with a small hole, the diameter of said lid or cover being greater at said second-mentioned vertical flange than at said first-mentioned vertical flange, the relation of the outside diameter of the top of said lid or cover to the diameter of said can at its top being such that there is an annular space left between the edge flange of said lid and the top of said can.

5. A can-body comprising a blank of sheet metal bent into cylindrical form, and being stretched at its upper portion for a suitable distance downward so that its diameter at its stretched portion is greater than its diameter below said stretched portion, and a lug or brace stamped out from said body in its stretched portion at the joint or seam formed in said can-body by the securing of the ends of said blank together, and soldering material filling the joint or seam and said lug or brace so that the surface of said can at said joint or seam or lug or brace will be flush with the rest of the surface of the can.

6. A can comprising a blank of sheet metal bent into cylindrical form, and being stretched at its upper portion for a suitable distance downward so that its diameter at its stretched portion is greater than its diameter below said stretched portion; a lug or brace stamped out from said body in its stretched portion at the joint or seam formed in said can-body by the securing of the ends of said blank together; soldering material filling the joint or seam and said lug or brace so that the surface of said can at said joint or seam or lug or brace will be flush with the rest of the surface of the can; a flexible bottom for said can, and a circular lid or cover made of sheet metal, comprising a top integrally provided on its top with an annular flange which overhangs an inwardly-formed portion with which is integrally formed an outwardly-extending flange with which is integrally formed a downwardly-extending flange provided with a small hole, the diameter of said lid being greatest when measured through said upwardly-extending flange.

7. A can-body comprising a blank of sheet metal bent into cylindrical form, and a lug or brace stamped out from said body at the joint or seam formed therein by the securing of the ends of said blank together thus forming a brace to prevent the opening of said joint or seam, and soldering material filling the joint or seam and said lug or brace.

8. A can comprising a blank of sheet metal bent into cylindrical form and provided with a bell-shaped mouth which construction places the abutting points of the metal out of the plane of a stretching force applied to said can; said can being stretched at its upper portion, by said stretching force, for a suitable distance downward from said bell-shaped mouth, so that the diameter at its stretched portion is greater than its diameter below said stretched portion, and soldering material filling the joint on the inside of said can so that the surface of the can at said joint or seam will be flush with the rest of the surface of the can; a circular lid or cover made out of sheet metal, comprising the top integrally provided on its edge with an annular flange which overhangs an inwardly-formed portion with which is integrally formed an outwardly-extending flange, with which is integrally formed a downwardly-extending flange, the diameter of said lid being greatest when measured through said downwardly-extending flange, which greatest diameter is slightly greater than the internal diameter of the stretched portion of the can so that the can may be hermetically sealed.

9. A can comprising a blank of sheet metal bent into cylindrical form and provided with a bell-shaped mouth, which construction places the abutting points of the metal out of the plane of a stretching force applied to the said can; said can being stretched at its upper portion by said stretching force, for a suitable distance downward from said bell-shaped mouth, so that the diameter at its stretched portion is greater than its diameter below said stretched portion; a lug or brace stamped out from said can in its stretched portion at the joint or seam formed in said can by the securing of the ends of said blank together, and in that position where the greatest bursting strain is applied by the insertion of the lid, thus forming a brace to prevent the opening of said joint or seam; soldering material filling the joint or seam and lug or brace so that the surface of the can at said joint or seam and lug or brace will be flush with the rest of the surface of the can; a circular lid or cover made out of sheet metal, comprising the top integrally provided on its edge with an annular flange which overhangs an inwardly-formed portion with which is integrally formed an outwardly-extending flange, with which is integrally formed a downwardly-extending flange, the diameter of said lid being greatest when measured through said downwardly-extending flange, which greatest diameter is slightly greater than the internal diameter of the stretched portion of the can so that the can may be hermetically sealed.

10. A can-body comprising a blank of sheet metal bent into cylindrical form and having its ends secured together by an outside lock-seam, and a lug or brace stamped from the inside of said body outward at the joint or seam formed therein by said lock-seam, so that its greatest length will be substantially at right angles to said joint or seam thus forming a brace to prevent the opening of said joint or seam, and soldering material filling said joint or seam.

In testimony whereof I have signed my name to this specification in the presence of two subscribing witnesses.

JOHN FORSTER ROSS.

Witnesses:
L. G. SHARPE,
H. H. ROSSER.